United States Patent [19]

Marzolf

[11] 4,174,515

[45] Nov. 13, 1979

[54] DEVICE FOR TRANSMISSION OF MEASUREMENT VALUES

[75] Inventor: Rene Marzolf, Eschborn, Fed. Rep. of Germany

[73] Assignee: VDO Adolf Schindling AG, Frankfurt am Main, Fed. Rep. of Germany

[21] Appl. No.: 850,708

[22] Filed: Nov. 11, 1977

[30] Foreign Application Priority Data

Nov. 16, 1976 [DE] Fed. Rep. of Germany ....... 2652122

[51] Int. Cl.² .............................................. B60C 23/02
[52] U.S. Cl. .................................. 340/58; 200/61.25; 343/6.5 SS; 73/146.5
[58] Field of Search ............ 340/58; 200/61.22, 61.25; 343/6.5 R, 6.5 SS, 6.8 R; 73/146.5

[56] References Cited

U.S. PATENT DOCUMENTS 3,806,905  4/1974  Strenglein ............................... 340/58
3,911,434  10/1975  Cook ....................................... 340/58

Primary Examiner—Alvin H. Waring
Attorney, Agent, or Firm—Martin A. Farber

[57] ABSTRACT

A device for transmission at least of one measurement value from a moveable object to an object stationary relative to the latter, particularly from a motor vehicle wheel to the vehicle frame of a motor vehicle, with a transmission stage and a receiving stage, which both are secured on the stationary object, and a coupling element which is secured on the moveable object and via which the receiver is able to be applied with a measuring value signal; characterized in the manner that a transmission stage transmits two transmission signals of different frequencies. At least one coupling element mixes the two frequencies and a receiving stage is responsive to at least one signal with a mixing frequency, which signal is transmitted by the coupling element.

20 Claims, 6 Drawing Figures

DEVICE FOR TRANSMISSION OF MEASUREMENT VALUES

The invention relates to a device for transmission at least of one measurement value from a moveable object to an object stationary relative to the latter, particularly from a motor vehicle wheel to the vehicle frame of a motor vehicle, with a transmitting stage and a receiving stage, which both are secured on the stationary object and a coupling element which is secured on the moveable object and via which the receiver is able to be applied with a measuring value signal.

Known devices of this type comprise a transmitting stage which transmits a signal with a predetermined frequency, a coupling element with an oscillating circuit tuned to the frequency of the transmitting signal and a receiving stage receiving the signal transmitted from the coupling element. With devices for monitoring the air pressure in motor vehicle tires a pressure switch is connected in the oscillating circuit, which operatively and inoperatively, respectively, switches the oscillating circuit in dependency on the air pressure in the tires. These known devices have the disadvantage that the transmitting antenna and the receiving antenna must be well decoupled from one another, since otherwise, that is, if the receiving antenna not only is applied with a signal from the coupling element but rather also is directly applied with a signal from the transmitting stage, thus too small a decoupling exists, then a non-objectionable operation of the device is not possible. Such a type of an urgent necessary decoupling is brought about by a corresponding spacial arrangement of the transmitting antenna and receiving antenna on the vehicle frame of the motor vehicle and the relatively stationary object, respectively. Since the quality of the decoupling is dependent strongly on the position and sizes of the metal parts in the range of the antenna, they must be provided directly on the vehicle during the construction of the device. The mounting of the devices is consequently cumbersome and time consuming and can be performed only by skilled personnel. On the same bases (good decoupling of the transmitting antenna and the receiving antenna), the distance between the coupling element and the antennas with the known devices must be held small, which considerably reduces the range of use of the device.

These disadvantages of the known devices are to be overcome by the invention. It is thus a task of the invention, to provide a device which requires no particular mechanical decoupling of the antennas at the place of use. Also an arrangement of the antennas on the one hand and the coupling element on the other hand is to be realizable in a larger distance from one another.

This task is solved in accordance with the invention in a manner that there are provided a transmitting stage (e.g., 6, 6') transmitting two transmission signals of different frequencies, at least one coupling element (9) mixing the two frequencies as well as a receiving stage (7') responsive to at least one signal with a mixing frequency, which latter signal is transmitted from the coupling element.

By these measures in accordance with the present invention any influence on the receiver by the transmitting signal is surely excluded, since the transmitting signal and the signal which is processable by the receiver have different frequencies. Consequently a mechanical decoupling of the antennas is completely done away with, as it heretofore was indispensable, and in addition the antennas and the coupling element can be arranged at substantially larger distances from one another than heretofore. The latter permits the application of the device in accordance with the present invention in a great number of application cases. A particular advantage of the invention resides in that the device can be used without additional expense also for the transmission of two measuring values from the moveable object to the object which is stationary relative to the latter.

According to one embodiment form of the invention the transmitting stage contains two transmitting antennas (e.g., 10, 11) of which one emits a signal with a first frequency and the second emits a signal with a second frequency. Another advantageous possibility resides in that one transmitting antenna (34) is provided in the transmitting stage, which permits a signal comprising the two linearly added frequency signals. Such an embodiment in comparison to the previously described embodiment has a substantially lower construction volume as well as a construction which is low in construction parts. Of certain disadvantage is that particular measures must be taken, in order to prevent during the radiation of the frequency signal, the formation of intermediate frequencies in which also that frequency is contained to which the receiving stage is responsive.

Each transmitting antenna (e.g., 10, 11, 34) advantageously is constructed as an oscillating circuit with a ferrite cored coil (14, 15). In a preferred embodiment each ferrite cored coil (14, 35) contains a bar-shaped ferrite core (15). Per se alone also U-shaped ferrite cores are usable, however the latter for achieving of a symmetrical radiation field must be provided with two coils connected electrically in series and arranged on the legs of the core, so that ferrite cored coils with a U-shaped coil have a more disadvantageous technical manufacturing construction than such with a rod-shaped ferrite coil. Also the space requirement of the coils with a rod-shaped ferrite coil is smaller than that of a coil with a U-shaped ferrite coil.

The coupling element (9) mixing both frequencies according one embodiment form of the invention comprises at least one oscillating circuit (22, 23) which contains a construction element (24) with a non-linear current-voltage-characteristic curve. As a non-linear constructive element, in an advantageous manner, a diode is provided, or also a transistor with a short-circuited collector junction or base-collector-path, whereby the diode is to be given the preference on the basis of cost.

According to a preferred embodiment of the invention, the coupling element (9) contains two parallel oscillating circuits (22, 23), of which one lies at a frequency which is within the frequency range predetermined by the transmitting frequencies, and the other is tuned to the mixing frequency, and both are connected with one another over a construction element (24) with a non-linear current-voltage-characteristic curve, thus for example the diode.

Such a construction of the coupling element, in comparison to a coupling element which merely contains an oscillating circuit has the advantage that it has a substantially higher efficiency. Beyond that, with a coupling element with two oscillating circuits, the distance between the coupling element and the transmission- and receiving-antenna in the case of need can be chosen larger than with use of a coupling element with only one oscillating circuit.

It has proven purposeful to tune one of the two oscillating circuits of the coupling element to the frequency $0.5\ (f_1+f_2)$ and the other to the frequency $(f_2-f_1)$, whereby $f_1$ and $f_2$ are frequencies of the two transmitting signals. In this manner the efficiency of the coupling element may be further increased.

For achieving of two resonance frequencies, the two oscillating circuits are not allowed to be too closely or tightly coupled. According to one embodiment form of the invention this is achieved in the manner that each oscillating circuit (22, 23) contains one coil (26, 28, 29) with a rod-shaped ferrite core and both ferrite cores are arranged spaced from one another. Another possibility of realization resides in that the coil (26) of one of the oscillating circuits (22), completely, and a part of the coil (28, 29) of the other oscillating circuit (23) are arranged on a common ferrite core (31), and the other part of the coil (28, 29) of the other oscillating oscillating circuit (23) is arranged on an adjustable ferrite body (33). With respect to the first described embodiment such an embodiment has the advantage of a substantially smaller construction volume. A further reduction of the construction volume can finally be achieved in the manner that both coils of the oscillating circuits (22, 23), respectively, are arranged completely and with spacing from one another on one ferrite core and at least one adjustable capacitor (30) is provided in the output oscillating circuit (23). In this manner however a certain coupling can occur between the two oscillating circuits, which can be disturbing for many cases of use, so that generally the previously described embodiment is fallen back on, with which the coils are arranged on a ferrite core and a ferrite body.

As mentioned in the introduction, the device can be constructed without particular additional expense such that two measured values can be transmitted from the moveable object to the object which is stationary relative thereto. In use of a tire monitoring system consequently not only can the air pressure in the individual vehicle tires be transmitted, but also its temperature. The detection of definite temperature values is of particular importance with motor vehicle tires which are used in the high speed range.

This transmission system for two measuring values can be realized according to a further concept of the invention in the manner that on the moveable object two coupling elements (9) are secured, which have a phase displacement of 180 angular degrees with respect to each other, and in the receiving stage (7), means (38) are provided for comparison of the phase of the coupling elements (9) with a reference phase. The two measuring values thus by measurement of the phase relationship are different from one another, the occurrence of a definite temperature or a definite air pressure being indicated by the presence or non-presence of the signal.

The phase displacement of 180 angular degrees between two coupling elements can be attained in the manner that two coupling elements (9) find use with differently pole diodes (24). Another possibility resides in the use of two equally constructed coupling elements and an offset spacial arrangement of these by 180 angular degrees with respect to one another. This last mentioned embodiment has substantial technical manufacturing advantages, since simply, coupling elements are to be produced of one definite construction. Moreover with the last-mentioned embodiment the storage is substantially simplified.

With a rotating object, thus for example with a motor vehicle tire, the two coupling elements most suitably are fixed with the same spacing from the rotating axle and diametrically relative to one another on the rotating object. With such an arrangement a subsequent balancing of wheels of the object and the tires, respectively, can be frequently done away with. In this manner the mounting or assembly expense can be further reduced.

In one preferred embodiment for the production of the signals of different frequency in the transmission stage (6) an oscillator (2) with a following connected frequency divider (3) is provided. In comparison to an embodiment with which an oscillator is provided for each fequency, this provides advantageous production costs. The use of a quartz oscillator has proven advantageous.

With the above and other objects and advantages in view, the present invention will become more clearly understood in connection with the following detailed description of preferred embodiments, when considered with the accompanying drawings, of which:

Figure 1:
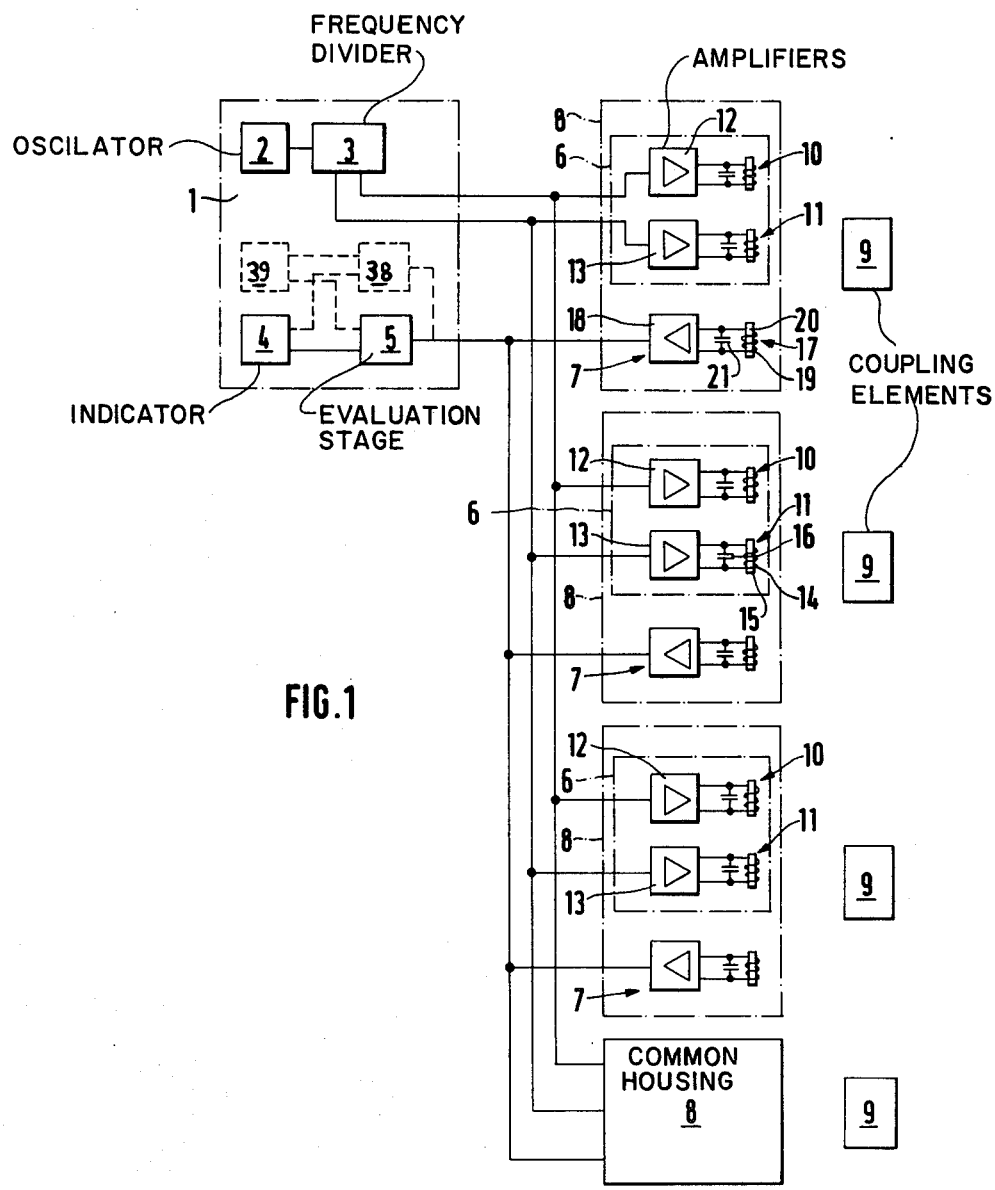
FIG. 1 is a block circuit diagram of a tire pressure monitoring device in accordance with the present invention.

Referring now to the drawing, and more particularly to FIG. 1, as set forth therein, the device comprises a central unit 1 with an oscillator 2 and a frequency divider 3 following the latter, from which two signals are taken off with a frequency $f_1$ and $f_2$. The frequency $f_1$ amounts to 123 KHz and the frequency $f_2$ amounts to 140 KHz. In the central unit 1 furthermore there is disposed a display or warning indicator 4 with a preconnected evaluation stage 5 for the receiving signal.

To each of the four not illustrated wheels of the motor vehicle, a transmitting stage 6 and a receiving stage 7 are coordinated, which stages are accomodated in a common housing 8 which is secured on the vehicle frame, as well as a coupling element 9.

Each transmitting stage 6 comprises two transmitting antennas 10 and 11 as well as two transmitting amplifiers 12 and 13 which are preconnected to the latter. The transmitting antennas, respectively, each comprise a coil 14 with a rod-shaped ferrite core 15 and a capacitor 16 connected in parallel to the coil 14, which together form an oscillating circuit. One of the oscillating circuits hereby is tuned to the frequency $f_1$ and the other to the frequency $f_2$.

The individual receiving stages 7 each contain a receiving antenna 17 and an amplifier 18 connected following the latter. The receiving antenna 17 likewise is constructed from a coil 19 with a rod-shaped ferrite core 20 as well as a capacitor 21, which together form an oscillating circuit for the frequency $(f_2-f_1)$ thus for 17 KHz.

Figure 3:
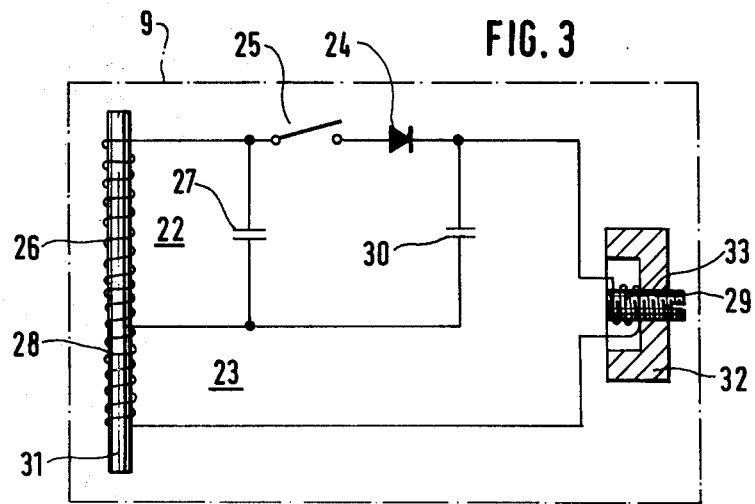
FIG. 3 is a circuit diagram of a coupling element.

The construction of the coupling element 9 is illustrated in FIG. 3. As evident therein, each coupling element 9 contains two parallel oscillating circuits 22 and 23, which are connected with one another via a diode 24 and a pressure switch 25. The oscillating circuit 22 which is constructed from the coil 26 and the capacitor 27 is tuned to a frequency $f_3$, for which the inequality $$f_1 \leq f_3 \leq f_2$$

holds. It may possibly amount to 131.5 KHz. The other output oscillating circuit 23 comprising the coils 28 and 29 and the capacitor 30 is tuned to the frequency $(f_2-f_1)$, thus 17 KHz. For decoupling both of the oscillating circuits 22 and 23, the inductivity of the oscillating circuit 23 is subdivided in the two coils 28 and 29, of which one coil 28 together with the coil 26 is disposed on the rod-shaped ferrite core 31 and the other coil 29 is disposed in a ferrite pot 32 with a displaceable core 33, by means of which the oscillating circuit is tuneable.

If the air pressure in the tires is in order, thus the switch 25 opens and the coupling element 9 transmits no frequency signal. However as soon as the air pressure becomes lower than a fixed value, the switch 25 closes and the coupling element transmits a signal with the frequency $(f_1-f_2)$, and the warning indicator display 4 is actuated.

Figure 2:
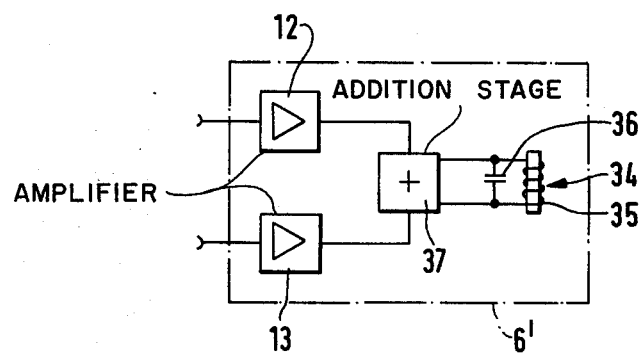
FIG. 2 is a modified embodiment of the tire pressure monitoring device according to FIG. 1.

Instead of a transmitting stage 6 also a transmitting stage 6' can be used. This comprises, as evident from FIG. 2, a single antenna 34, which moreover is constructed from a ferrite cored coil 35 and a capacitor 36, two transmitting amplifiers 12 and 13 and a stage 37 which linearly adds the two frequency signals.

By use of two coupling elements per vehicle tire for transmission of a temperature-dependent and a pressure-dependent signal, in the central unit 1 additionally a stage 38 is still required, which provides a comparison of the phase of the receiving signal with that of a reference signal of the same frequency, which reference signal is produced in the central unit, as well as a further warning indicator or attention display 39. It may be pointed out that instead of the two coupling elements there a single one can also be used with a reversible or polarity reversible non-linear construction element for the transmission of the two measured values.

Figure 4:
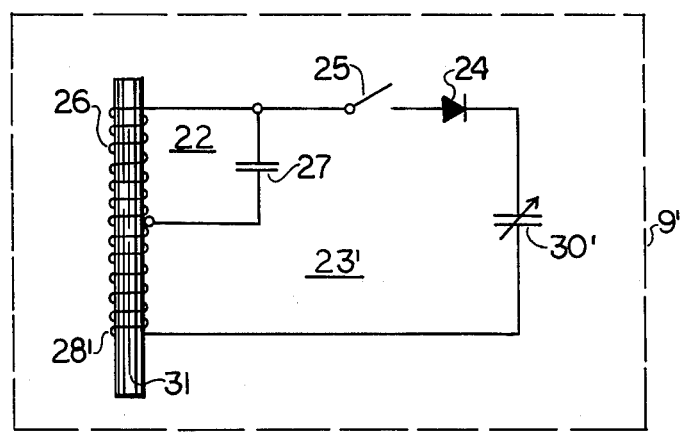
FIGS. 4 and 5 are circuit diagrams of modified embodiments of a coupling element.

FIG. 4 shows a modified embodiment of a coupling element. The coupling element 9' contains two parallel oscillating circuits 22 and 23', which are connected with another by means of the diode 24 and the pressure switch 25. Contrary to the coupling element 9, the coils 26 and 28' are completely arranged spaced from another on the ferrite core 31. Moreover an adjustable capacitor 30' is provided in the oscillating circuit 23' for tuning reasons.

Figure 5:
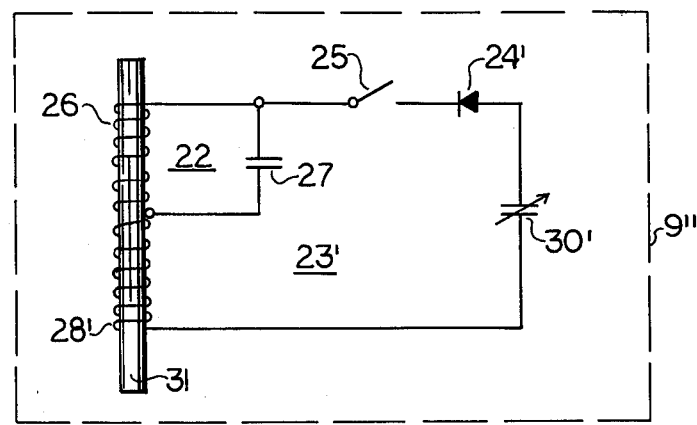

The coupling element 9" which is illustrated in FIG. 5 differs from the previously described coupling element 9' only by the diode 24' which is inversely poled.

Figure 6:
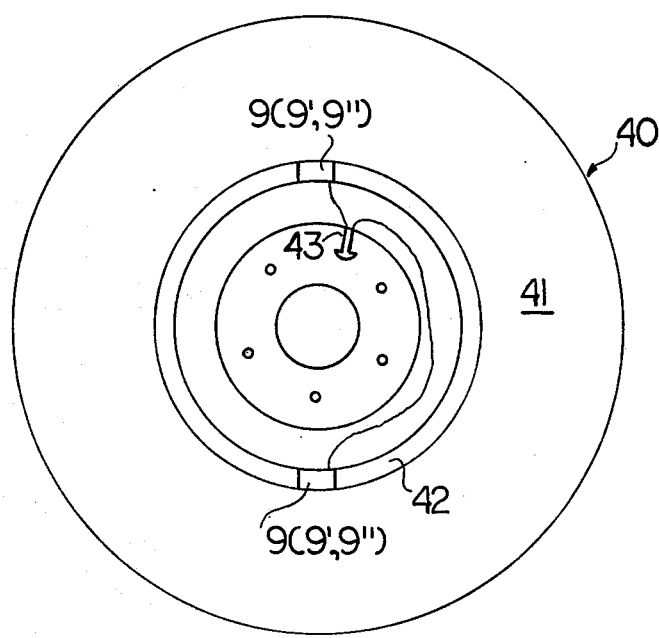
FIG. 6 is an elevational view of a vehicle wheel with coupling elements mounted thereon.

FIG. 6 shows a motor vehicle wheel 40 with a tire 41 and a felloe 42 on which two coupling elements 9 (9', 9") are mounted diametrically with respect to one another and with equal spacing from the axis. One coupling element is connected to a temperature switch and the other to a pressure switch which are screwed on the tire valve 43.

While there has been disclosed several embodiments of the invention, it is to be understood that these embodiments are given by example only and not in a limiting sense.

I claim:

1. A device for transmission at least of one measurement value from a moveable object to a object stationary relative to the latter, particularly from a motor vehicle wheel to the vehicle frame of a motor vehicle, with a transmitting stage and a receiving stage, which both are secured on the stationary object and a coupling element which is secured on the moveable object and via which the receiver is able to be applied with a measuring value signal, comprising a transmitting stage means for transmitting two transmission frequency signals of different frequencies, at least one coupling element means for mixing the two different frequencies and for transmitting at least one signal with a mixing frequency, a receiving stage means for being responsive to the at least one signal with a mixing frequency transmitted from said coupling element means, said coupling element means comprises at least one oscillating circuit containing a construction element with a non-linear-current voltage characteristic curve, said coupling element means contains two parallel oscillating circuits including said at least one oscillating circuit, one of said parallel oscillating circuits lies at a frequency within a frequency range which is predetermined by the transmission frequencies, and the other of said circuits is tuned to the mixing frequency, and said construction element with a non-linear current-voltage characteristic curve connects both of said two parallel oscillating circuits with each other.

2. The device according to claim 1, wherein said transmitting stage means comprises two transmitting antennas, one of said antennas emits a signal with a first frequency $f_1$ and the other antenna emits a signal with a second frequency $f_2$.

3. The device, as set forth in claim 1, wherein said transmitting stage means includes one transmitting antenna means, said one transmitting antenna means for transmitting a signal comprising a linear addition of said two transmission frequency signals.

4. The device as set forth in claim 2, wherein each of said transmitting antennas constitutes an oscillating circuit with a ferrite cored coil.

5. The device as set forth in claim 3, wherein said one transmitting antenna means constitutes an oscillating circuit with a ferrite cored coil.

6. The device as set forth in claim 4, wherein each ferrite cored coil has a rod-shaped ferrite core.

7. The device as set forth in claim 5, wherein each ferrite cored coil has a rod-shaped ferrite core.

8. The device as set forth in claim 1, wherein one of said oscillating circuits is tuned to the frequency $0.5(f_1+f_2)$ and the other of said oscillating circuits is tuned to a frequency $(f_2-f_1)$, whereby $f_1$ and $f_2$ are the frequencies of said two transmission frequency signals.

9. The device as set forth in claim 1, wherein each of said oscillating circuits includes a coil with a rod-shaped ferrite core, and both of said ferrite cores are arranged separated from one another.

10. The device as set forth in claim 1, further comprising one of said oscillating circuits includes a first coil, the other of said oscillating circuits includes a second coil, a common ferrite core on which said first coil of said one of said oscillating circuits is completely mounted and on which a part of said second coil of said other oscillating circuit is mounted, an adjustable ferrite body on which the other part of said second coil of said other oscillating circuit is mounted.

11. The device as set forth in claim 1, wherein each of said oscillating circuits include a coil,
a ferrite core on which both said coils of said oscillating circuits, respectively, are completely disposed spaced from one another, and
one of said oscillating circuits constitutes an output oscillating circuit,
at least one adjustable capacitor disposed in said output oscillating circuit.

12. The device as set forth in claim 1, wherein said non-linear construction element constitutes a diode.

13. The device as set forth in claim 1, wherein said non-linear construction element constitutes a transistor with a short-circuited collector junction.

14. A device for transmission at least of one measurement value from a moveable object to a object stationary relative to the latter, particularly from a motor vehicle wheel to the vehicle frame of a motor vehicle, with a transmitting stage and a receiving stage, which both are secured on the stationary object and a coupling element which is secured on the moveable object and via which the receiver is able to be applied with a measuring value signal, comprising
a transmitting stage means for transmitting two transmission frequency signals of different frequencies,
at least one coupling element means for mixing the two different frequencies and for transmitting at least one signal with a mixing frequency,
a receiving stage means for being responsive to the at least one signal with a mixing frequency transmitted from said coupling element means,
said at least one coupling element means comprises two coupling elements having a phase displacement of 180 angular degrees from one another, said two coupling elements are adapted to be secured on the moveable object,
comparison means for comparing the phase of said two coupling elements with a reference phase, said comparison means is disposed in said receiving stage means.

15. The device as set forth in claim 14, wherein said two coupling elements include differently poled diodes, respectively.

16. The device as set forth in claim 14, wherein said two coupling elements each have the same construction and are arranged spacially offset with respect to one another by 180 angular degrees.

17. The device as set forth in claim 14, wherein further in combination
a rotating object constitutes the moveable object,
said two coupling elements are fixed on said rotating object diametrically with respect to one another and with equal spacing from the axis of rotation of said rotating object.

18. The device as set forth in claim 1, wherein said coupling element means contains a reversible non-linear construction element.

19. The device as set forth in claim 1, further comprising
an oscillator and a frequency divider means connected to the output of said oscillator for production of said two transmission frequency signals of different frequencies in said transmitting stage means.

20. The device as set forth in claim 19, wherein said oscillator constitutes a quartz oscillator.

* * * * *